Sept. 23, 1969  E. G. PICKELS  3,468,997
METHOD OF MAKING A HIGH STRENGTH ROTARY MEMBER
Original Filed March 14, 1963
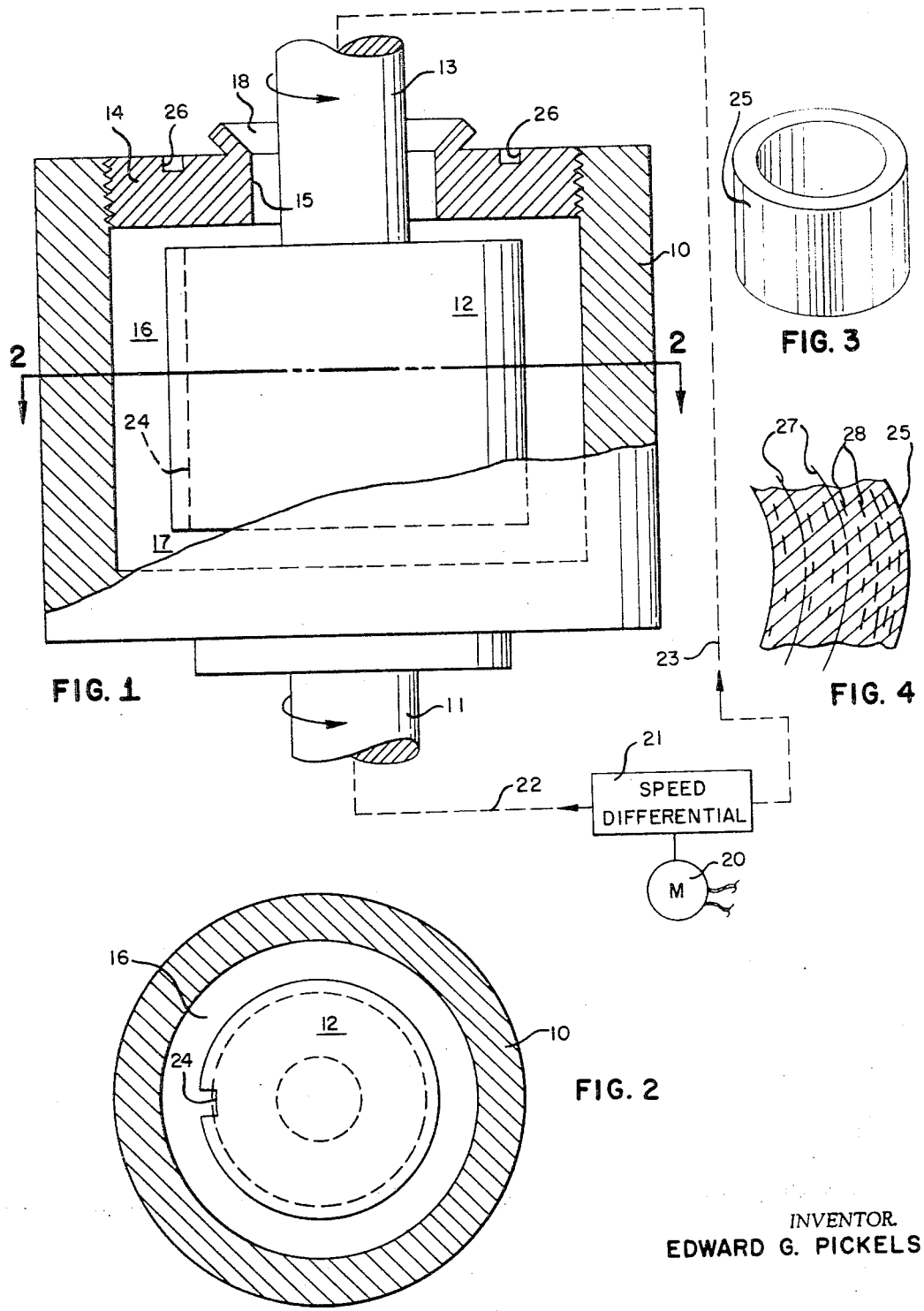
INVENTOR.
EDWARD G. PICKELS United States Patent Office 3,468,997
Patented Sept. 23, 1969

3,468,997
METHOD OF MAKING A HIGH STRENGTH ROTARY MEMBER
Edward G. Pickels, Atherton, Calif., assignor to Beckman Instruments, Inc., a corporation of California
Original application Mar. 14, 1963, Ser. No. 265,090, now Patent No. 3,263,274, dated Aug. 2, 1966. Divided and this application Dec. 1, 1965, Ser. No. 516,833
Int. Cl. B29c 5/04; B28b 7/18, 21/30
U.S. Cl. 264—108                                     1 Claim

ABSTRACT OF THE DISCLOSURE

A method for forming a high strength rigid cylindrical member adapted for high speed rotation including the steps of pouring a fluid material including elongated particulate matter into a rotatable mold, rotating the mold at a substantial angular velocity for a predetermined period of time to centrifuge the material and distribute a progressively greater percentage of the particulate matter in the more radially remote portions of the mold, and solidifying the material to form a cylindrical member with a concentration of particulate matter per unit volume of material being progressively greater in the more radially remote portions of the member. The method also includes the step of rotating a mandrel disposed within the mold at a, relatively speaking, different angular velocity than the mold so as to orientate the particulate matter with its long dimension lying substantially normal to the radii of the rotating mold and in a plane substantially parallel to the plane of rotation of the mold.

---

This is a division of application Ser. No. 265,090 filed Mar. 14, 1963, now U.S. Patent No. 3,263,274 issued Aug. 2, 1966 and relates to a method of making a high strength rotary member as, for example, the rotor of an ultra-centrifuge.

In centrifugation procedures, rotors are utilized at speeds ranging up to a safe margin below the threshold of disintegration. The ultimate safe speed of rotation is therefore limited by the ultimate strength of the rotor, particularly radially of its axis of rotation. Ever increasing speeds are being achieved through selection of stronger, though more expensive, rotor construction materials, as well as through application of traditional metallurgical techniques to such materials.

In manufacture of high speed rotors I have observed that certain conditions during manufacture, such as work hardening, contribute to development of low strength regions in the construction material. I have further observed that lack of homogeneity in the construction material contributes to these low strength concentrations. At ultra high speeds these low strength regions tend to initiate disintegration. An increased density concentration material near the periphery of the rotor seems to increase radial strength.

It is a general object of the invention to provide a method of making a strengthened rotary member for extremely high speed rotation.

It is another object of the invention to provide a method of making a high strength rotor by casting a construction material and centrifuging same in a mold while the material is still fluid.

A more specific object of the invention is to provide a method of forming a strengthened rotor by providing portions near the periphery of the rotor member with an increased concentration of elongated particles.

These and other objects will become more apparent from the following description when taken in conjunction with the drawings, in which:

FIGURE 1 is a schematic representation partially in section of apparatus for providing a strengthened rotor according to the invention;
FIGURE 2 is a section view (reduced in size) taken along the line 2—2 of FIGURE 1;
FIGURE 3 is a perspective view showing a strengthened rotor according to the invention; and
FIGURE 4 is a schematic detail view of a section of FIGURE 3 showing the progressively increased concentration of elongate particles in radially displaced portions of the rotor of FIGURE 3.

In general, in order to form a cylindrically shaped member such as would be useful for the bowl of a centrifuge rotor, I accumulate rotor construction material in fluid condition in a rotatable mold, rotate the mold at substantial angular velocity in order to centrifuge the material, and solidify the material in order to form the rotor with an increased concentration of heavier particles near the periphery.

The foregoing procedure can be improved by preparing a predetermined volume of fluid material so as to include elongate particulate matter, i.e., either discrete particles or long molecules, and then orienting the matter with the long dimension thereof lying substantially in concentric circular paths about a common axis. The material is then solidified to retain the above orientation of the elongate matter.

A cylindrical centrifuge bowl 25, such as shown in FIGURE 3, can be formed by applying centrifugal forces to the material thereof and maintaining the material in a state of shear as the construction material sets up. In general, the apparatus of FIGURE 1 comprises a hollow cylindrical mold open at one end for receiving therein fluid material containing elongate particulate matter. The mold is mounted for centrifugation about its own axis. A mandrel depends coaxially into the mold and is rotatable with respect thereto. Means are provided for rotating the mold and mandrel at different respective angular velocities to provide layers of shear in the fluid material. The layers of shear serve to orient elongated particles included in the material to dispose them substantially normal to radii of the bowl.

Although the present invention will be particularly described with reference to a method of making a cylindrical bowl member for a centrifuge rotor assembly, it is to be understood that the method also pertains to the making of other types of high strength cylindrical members, as well as to a method of imparting high radial strength to cylindrical constructions.

Equipment suitable to orient the particulate matter can include a hollow bowl-shaped mold 10 mounted upon a shaft 11. A mandrel 12 is fixed to the end of an associated shaft 13 and arranged to depend coaxially into the interior of mold 10 to rotate relative thereto. The upper end of mold 10 threadably receives a closure member 14. Member 14 is formed with an opening 15 through which fluid material can enter the annular region 16 defined between the periphery of mandrel 12 and the inner wall of mold 10. Mandrel 12 is also spaced from the bottom of mold 10 to form a circular region 17. Regions 16 and 17, therefore, generally define the form of a cylindrically shaped, hollow centrifuge rotor bowl 25. The top surface of member 14 is further provided with a funnel-like flange 18 for more easily pouring fluid material into mold 10.

Means are provided for driving shafts 11 and 13 at different angular velocities. A motor 20 is connected to drive a suitable speed differential mechanism 21 of conventional construction. Speed differential 21 is connected to drive the shafts 11, 13, by means of suitable drive connections 22, 23.

A slot 24 can be formed in mandrel 12. Slot 24 insures an adequate supply of construction material sufficient to provide full thickness to the bowl wall. Operation of motor 20 drives mandrel 12 and mold 10 to maintain a different rotational velocity of the material at the inner and outer boundaries thereof and at radially displaced portions therebetween to produce layers of shear 27 therein.

In strengthening a rotor by means of increasing peripheral density I follow generally the steps of accumulating construction material in fluid condition in a rotatable mold, rotating the mold at substantial angular velocity to centrifuge the material, and then solidify the material, either by merely permitting it to set up as by cooling or by actively inducing solidification. The latter can be accomplished by chemical reaction, refrigeration, heating, or otherwise as dictated by the selected rotor material.

The method employed to form a rotor, such as bowl 25, generally follows the steps of preparing a predetermined volume of fluid construction material including elongate particulate matter, orienting the matter with the long dimension thereof lying substantially in circular paths about an axis common thereto, and solidifying the material to retain the orientation. Preferably I further apply to the matter a substantial concentrating or compacting force acting radially away from the axis of rotation while the elongate matter is so oriented.

More particularly a preferred method of manufacturing a rotor bowl 25 as shown in FIGURE 3, starting for example, with a normally solid thermoplastic material such as aluminum, or titanium, can commence by heating the construction material to a fluid condition. I then accumulate in rotatable mold 10 a predetermined volume of the construction material in regions 16, 17. I also preferably accumulate therein a quantity of elongated particles such as chopped glass, or iron filings, or the like, having relatively high tensile strength lengthwise thereof. I next rotate the mold at typical centrifugation velocities on the order of 1000 r.p.m. During rotation of mold 10 a "drag" is imparted to an upwardly extending boundary portion of the material so as to provide layers of shear 27. This is best handled by applying an angular velocity differential between radially displaced portions of the material in mold 10. The differential serves to orient elongate particulate matter transversely to the radii of the mold. This can be done by rotating mandrel 12 faster than, slower than, or in an opposite direction to the mold 10. Accordingly, any suitable speed differential mechanism 21 can be selected for these functions.

The fluid material is then solidified, such as by permitting it to cool. After cooling, member 14 can be removed by means of a spanner wrench engaging detents 26 and the bowl-shaped member 25 is then removed. Member 25 will have a lug formed on its inner wall corresponding to groove 24 and this can be removed by suitable machining.

As represented in FIGURE 4, the foregoing procedure provides a number of concentric circular layers of shear 27 in bowl 25 during centrifugation which serve to orient particulate matter 28 virtually tangent to circular layers 27. By disposing the matter 28 transversely to radii of layers 27, enhanced strength can be imparted to rotor-type members without resort to development of expensive metallurgical compounds or treatment. The more nearly perpendicular the angle of disposition becomes with respect to the radii, the greater will be the resistance to disintegration under extreme velocities.

The foregoing procedure also serves to distribute a progressively greater concentration of elongate particulate matter 28 in those portions of bowl 25 which are closer to the periphery. As indicated above, the term "elongate particulate matter" should be understood to include the use of construction material simply having long molecules as well as construction material which has been combined with "discrete particles of matter" such as chopped glass or iron filings which are readily visible to the naked eye. Thus, in FIGURE 4 it is noted that the larger particles are outermost, and that the separation between layers of shear is greater innermost.

From the foregoing it will be readily evident that a high strength, rigid cylindrical member adapted for high speed rotation about the axis thereof has been provided. The member is formed of a construction material including elongate particulate matter, the long dimension of the matter lying substantially normal to radii of the cylindrical member. It will be further evident that the concentration of the matter per unit volume of material is greater in portions of the cylindrical member farther from the axis of rotation.

If it is desired to use other construction materials such as thermosetting plastics, elongate particulate matter can first be oriented by means of an angular velocity differential as described above. Solidification of thermosetting material would then need to be actively induced, as by heating. One suitable plastic for this purpose is phenolic. This material will solidify if heated to 350° F. and maintained thereat for several minutes.

Chemically settable materials can also be employed, such as epoxy which can be solidified by addition of a catalyst.

While a preferred embodiment has been pointed out and described, it will be understood that various omissions and substitutions in the form and detail of the invention may be made by those skilled in the art, without departing from the spirit of the invention. For example, magnetic or electrostatic forces might be utilized to align the elongate particulate matter. Therefore, it is the intention to be limited only by the scope of the following claims.

I claim:

1. A method of forming a high strength rigid cylindrical member adapted for high speed rotation comprising the steps of pouring a material in a fluid condition into a rotatable mold, said material including elongated particulate matter, rotating said mold at a substantial angular velocity for a predetermined period of time to centrifuge the material and distribute a progressively greater percentage of said particulate matter in the more radially remote portions of the mold, simultaneously rotating a mandrel positioned within the mold at a relatively different angular velocity than the mold to orientate said particulate matter with its long dimension lying substantially normal to the radii of the rotating mold and substantially in circular paths about an axis common thereto and solidifying the material to form a cylindrical member with a concentration of particulate matter per unit volume of material being progressively greater in the more radially remote portions of the member.

References Cited

UNITED STATES PATENTS

| 3,290,426 | 12/1966 | Barrentine | 266—311 X |
| 2,265,226 | 12/1941 | Clewell et al. | 264—311 X |
| 3,103,722 | 9/1963 | Whitehurst et al. | 164—97 X |
| 2,129,702 | 9/1938 | Merle | 164—114 X |
| 2,993,235 | 7/1961 | Brown et al. | 264—108 |
| 3,222,439 | 12/1965 | Bolomey et al. | 264—312 |

FOREIGN PATENTS 611,629  1/1961  Canada.

J. SPENCER OVERHOLSER, Primary Examiner

V. K. RISING, Assistant Examiner

U.S. Cl. X.R.

164—58, 97, 115; 264—312